United States Patent Office 3,597,470
Patented Aug. 3, 1971

3,597,470
PURIFICATION OF BIS(2-HYDROXYETHYL) TEREPHTHALATE
Enrique R. Witt and Bobby J. Bland, Corpus Christi, Tex., assignors to Celanese Corporation, New York, N.Y.
No Drawing. Filed Jan. 24, 1968, Ser. No. 700,042
Int. Cl. C07c 69/82
U.S. Cl. 260—475PR
3 Claims

ABSTRACT OF THE DISCLOSURE

A process for the purification of bis(2 - hydroxyethyl) terephthalate comprising contacting a solution of the terephthalate with sodium borohydride or diborane followed by crystallization of the terephthalate from solution.

BACKGROUND OF THE INVENTION

The present invention relates to a process for the purification of bis(2-hydroxyethyl) terephthalate.

In recent years the production of linear super polyesters of polyethylene terephthalate has become of significant commercial interest. These polyesters may be produced by a variety of methods one of which is the polymerization of chemically pure bis(2-hydroxyethyl) terephthalate, hereinafter referred to as BHET. Since it is highly desirable that these super polyesters be free of any significant discoloration it is necessary to use a BHET starting material that is substantially free of any impurities (such as aldehydes and/or nitrogen compounds) which may contribute to the discoloration of the polyester. It is for this reason that many processes have been devised for the production of high purity BHET. For example, preparation of BHET by the reaction of terephthalic acid and ethylene glycol, by the reaction of salts of terephthalic acid with ethylene chlorohydrin, and by the reaction of terephthalic acid with ethylene oxide have been reported in the literature. Even though these methods are satisfactory for the production of BHET, the BHET so obtained is usually contaminated with impurities found in the terephthalic acid or terephthalic acid salt starting material. Of course a high purity terephthalic acid starting material can be used but such a method is generally not economically attractive.

SUMMARY

It is thus an object of the present invention to provide a process for the purification of BHET. It is a further object of the present invention to provide a process for reducing the color forming impurities in BHET so that the BHET will be suitable for fiber forming.

These and other objects are accomplished by the present invention which in one of its embodiments is a method for reducing the impurities in impure bis(2-hydroxyethyl) terephthalate comprising (a) contacting a liquid solution of impure bis(2-hydroxyethyl) terephthalate with sodium borohydride (NaBH$_4$) or diborane (B$_2$H$_6$), the solvent being water with the contacting taking place at a pH of from about 7.0 to 10.0 when sodium borohydride is used and the solvent being an inert, liquid organic solvent for the reactants when diborane is used;
(b) effecting crystallization of bis(2 - hydroxyethyl) terephthalate; and
(c) recovering the thus purified bis(2-hydroxyethyl) terephthalate.

A crude terephthalate may be purified by this process so as to be essentially free of such impurities as aldehydes which may contribute to discoloration as well as other color forming impurities which have not yet been identified. While the applicant does not wish to be limited regarding the mechanism of the present invention it appears that the aldehyde, nitrogen compounds, etc. are converted to compounds, salts or adducts which are more soluble in solvent than the diester, thereby remaining in solution when the diester crystallizes out.

DESCRIPTION OF THE PREFERRED EMBODIMENT

As may be seen from the above summary, the present invention is relatively simple in operation as it only involves contacting a solution of BHET with sodium borohydride followed by crystallization and separation. Removal of impurities such as nitrogen compounds and/or aldehydes can be accomplished regardless of the concentration of the diester in the solution, however, it is generally preferred to treat solutions containing less than about 50% by weight of the terephthalate, for example from 1 to 50% by weight. It is preferable to treat solutions according to the present invention containing about 5 to 40% by weight of BHET.

When using sodium borohydride as the treating agent, an aqueous solution of the terephthalate is used and in such case the process should generally be conducted at a pH of from about 7.0 to 10.0, with best results being obtained in the range of about 7.3 to 8.7. Any necessary adjustment of the pH of the aqueous solution may be accomplished before the solution is contacted with the borohydride or may be accomplished concurrently with the contacting of the aqueous terephthalate solution with the borohydride. For example, a solution of sodium borohydride and sodium hydroxide could be added to the aqueous BHET solution so as to both raise the pH and to accomplish contact of the solution with the borohydride. Generally speaking a solution of crude BHET produced by conventional known methods such as those listed above will have a pH of about 4 and therefore it will usually be necessary to adjust the pH.

The contact time required for removal of impurities is very low, e.g. about 10 seconds is usually sufficient, although increased contact times up to a day or two and longer have no detrimental effect. Generally the contact time should be at least 3 seconds although preferably the contact time is from about 5 seconds to 10 minutes. Agitation is not required during the contact of the terephthalate solution with the borohydride or diborane, but agitation is desirable so as to accomplish intimate mixing of the reactants. When using diborane as the treating agent, the solvent used will be an inert, organic solvent for the reactants, i.e. a solvent for both the BHET and for the diborane under the reaction conditions. The solvent must be liquid at reaction conditions and by inert is meant that the solvent is substantially unaffected under the reaction conditions by either the diborane or the terephthalate. Since diborane reacts instantly with water, the reaction must be performed under anhydrous conditions when using diborane and therefore care must be taken that the solvent as well as the crude BHET is dry. In general the organic solvents which are desirable are hydrocarbons free of other than aromatic unsaturation, halogenated hydrocarbons free of other than aromatic unsaturation, hydrocarbon ethers free of other than aromatic unsaturation, and C$_3$ to C$_{12}$ esters of aliphatic monocarboxylic acids. The C$_3$ to C$_{12}$ is in reference to the total number of carbon atoms in the ester as obtained by adding the number of carbon atoms in the acid portion of the ester to those in the ester group. Some specific compounds which may be used include pentane, hexane, decane, cyclohexane, benzene, xylene, cumene, chlorotoluene, chlorobenzene, chloroform, methylene chloride, tetrahydrofuran, diethyl ether, diphenyl ether, methyl acetate, ethyl butyrate, etc. Among other solvents that may be used are polyethers, nitroalkanes, nitrated aromatic hydrocarbons, sulfides, sulfoxides, and sulfones. The preferred of the organic solvents are the hydrocarbons, especially the $C_8$ aromatic hydrocarbons such as ethyl benzene, p-xylene, m-xylene, o-xylene or mixtures thereof. Solvents should generally be avoided which contain amino, cyano, oxido, hydroxyl or carbonyl groups in the molecule as well as those having ethylenic or acetylenic unsaturation.

Following the time period during which the treating agent is in contact with the terephthalate solution, the solution will then be treated so as to effect crystallization of the BHET and to recover the thus purified, crystallized product. This can be done by various methods and the particular method employed does not constitute a part of the present invention. The most direct way is of course to cool the terephthalate solution which was treated in accordance with the present invention so as to effect crystallization of the BHET and then to recover the purified BHET crystals such as by filtration followed by washing, drying, flaking and the like. Of course, once the BHET is crystallized the product does not have to be recovered in flake or crystalline form but could be recovered as a solution. Also the crystallization does not have to necessarily be from the solution treated with the diborane or sodium borohydride since the BHET could first be transferred to a different solvent by solvent extraction techniques and then the crystallization effected. In effecting the crystallization of the BHET from solution, the temperature to which the solution must be cooled will of course depend on the solvent used and the concentration. The particular temperature for a given solvent and concentration is easily determined and the crystalization of BHET from various solvents is taught in the prior art. For example, when aqueous solutions are used, crystallization may be effected by cooling to below about 40° C., preferably to about 25° C. In the case of a mixed xylene solvent, crystallization may generally be effected at about 40° C. while with a chlorotoluene solvent temperatures on the order of 70–80° C. are generally sufficient. The process of the present invention may also be utilized together with other purification treatments such as treatment with activated charcoal.

The temperature and pressure during the contacting of the diborane or sodium borohydride with the terephthalate solution are such that the solution is maintained in liquid phase. The temperature range will generally be between about 0° C. and 200° C. but the temperature used will vary according to the solvent used. At the lower temperatures, solubility of the diester decreases and therefore only dilute solutions can be treated while the use of higher temperatures can result in the necessity of superatmospheric pressures in order to maintain a liquid phase condition. Also temperatures above 100° C. sometimes cause losses of BHET due to decomposition, hydrolysis, and the like. Especially when aqueous solutions are used, it is preferred to operate between about 55° C. and 95° C.

The amount of sodium borohydride or diborane treating agent necessary in the present process will of course depend on the purity of the crude BHET and the desired degree of purification, but the amount is relatively small and will generally fall between about 5 p.p.m. (parts per million) to 2.5% based on the weight of impure BHET contained in the solution being treated. Larger amounts or smaller amounts of the treating agent may be used but larger amounts will generally result in wasted diborane or sodium borohydride while smaller amounts will generally not give the desired degree of purification unless the BHET material being treated is already of fairly high purity. Of course, the amount used should be an amount which is soluble at the temperature at which the BHET is crystallized from solution so as to avoid contamination of the BHET crystals. Preferably the amount of BHET to be used will be from about 0.01% to 1.5% based on the weight of impure BHET.

The following examples are given to illustrate specific embodiments of the present invention. All percentages are by weight unless otherwise specified.

EXAMPLE I

To an aqueous solution of crude BHET containing 10.8% by weight of crude BHET and maintained at a pH of 8.0 is added varying portions of sodium borohydride with mixing. The temperature of the aqueous BHET solution is 80° C. at the time of addition of the borohydride. The solution is immediately cooled to about 20° C. in order to effect crystallization of the BHET from solution and the crystals removed by filtration, washed with water and analyzed by the polarographic method for total aldehyde content. The results of the several runs are shown in the following table, the original crude BHET having contained about 1900 p.p.m. of the hydroxyethyl ester of carboxybenzaldehyde as an impurity.

TABLE

| Run No.: | Percent $NaBH_4$* | Total aldehydes, p.p.m. |
|---|---|---|
| 1 | 0.030 | 500 |
| 2 | 0.061 | 135 |
| 3 | 0.089 | 30 |
| 4 | 0.122 | 27 |
| 5 | 0.150 | 20 |

* Based on the weight of crude BHET.

As may be seen from the table, the addition of sodium borohydride drastically reduces the amount of color forming impurities present in the BHET.

EXAMPLE II

In order to illustrate the effect of variation of pH on the purification process of the present invention when treating aqueous solutions, three runs are made in which a 12.4% aqueous solution of crude BHET is treated with an amount of sodium borohydride corresponding to about 0.094% based on the weight of crude BHET present. After the addition of the sodium borohydride with mixing, the solution of BHET is cooled so as to crystallize the BHET and the BHET crystals washed and analyzed by the polarographic method. The orginal crude BHET contained about 2200 p.p.m. of total aldehydes, mainly the hydroxyethyl ester of carboxybenzaldehyde.

The first run is run at a pH of 6 and shows no reduction in aldehyde impurities. The BHET recovered from the second run made at a pH of 7 contains about 874 p.p.m. total aldehydes, and the third run at a pH of about 8 contains about 94 p.p.m. of aldehyde impurities. Thus it may be seen that the pH of the solution is critical if purification is to be obtained in accordance with the present invention.

EXAMPLE III 800 milliliters of a 10% solution of crude BHET in mixed xylenes is added to a 2 liter flask fitted with a condenser, a sealed stirred, and an inlet for nitrogen. The temperature of the solution is maintained at about 140° C. by means of an electrical heater in order to prevent crystallization of the diester. The flask is then flushed with nitrogen and a nitrogen atmosphere maintained while gaseous diborane in an amount corresponding to about 0.4% based on the weight of the crude BHET present is added with stirring. Stirring is continued for about 5 minutes after the addition of the diborane and then the xylene solution BHET is cooled to about 40° C. in order to crystallize the diester, the crystals removed by filtration and washed with cold (10° C.) water. The total amount of nitrogen compounds and aldehydes in the crude BHET is reduced from about 10,000 p.p.m. to about 60 p.p.m.

As may be seen from the above examples, both diborane and sodium borohydride are effective in reducing the color forming impurities in bis(2-hydroxyethyl) terephthalate, however, it is preferred to utilize sodium borohydride as a treating agent. Sodium borohydride is not only much easier and safer to handle than diborane, but its use also allows water to be utilized as the reaction solvent. Water is not only a generally available and relatively cheap solvent but is a solvent which allows lower reaction temperatures than most organic solvents because of the relatively high solubility of BHET in water. As diborane is extremely flammable and explosive, extreme care must be taken when handling this normally gaseous substance.

The embodiments of the invention in which an exclusive property or privilege is claimed are defined as follows:

1. A method for reducing the impurities in impure bis(2-hydroxyethyl) terephthalate containing the hydroxyethyl ester of carboxybenzaldehyde as an impurity comprising (a) contacting a liquid solution of impure bis(2-hydroxyethyl) terephthalate in a liquid organic solvent with diborane;

(b) effecting crystallization of bis(2-hydroxyethyl) terephthalate; and (c) recovering the thus purified bis(2-hydroxyethyl) terephthalate.

2. The process of claim 1 wherein the amount of diborane is from about 0.01 to 1.5 weight percent based on the terephthalate.

3. The process of claim 1 wherein the solvent is comprised substantially of a $C_8$ aromatic hydrocarbon.

References Cited

UNITED STATES PATENTS

| | | | |
|---|---|---|---|
| 2,874,165 | 2/1959 | Brown | 260—343.6 |
| 3,420,879 | 1/1969 | Meyer | 260—525 |

LEWIS GOTTS, Primary Examiner

E. JANE SKELLY, Assistant Examiner